United States Patent
Cho et al.

(10) Patent No.: US 8,634,675 B2
(45) Date of Patent: Jan. 21, 2014

(54) APPARATUS AND METHOD FOR GENERATING EXTRAPOLATED VIEW BASED ON IMAGE RESIZING

(75) Inventors: Yang Ho Cho, Hwaseong-si (KR); Du-Sik Park, Suwon-si (KR); Ho Young Lee, Suwon-si (KR); Kyu Young Hwang, Hwaseong-si (KR); Young Ju Jeong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 371 days.

(21) Appl. No.: 13/177,945

(22) Filed: Jul. 7, 2011

(65) Prior Publication Data

US 2012/0033872 A1 Feb. 9, 2012

(30) Foreign Application Priority Data

Aug. 3, 2010 (KR) .................. 10-2010-0074908

(51) Int. Cl.
*G06K 9/36* (2006.01)
(52) U.S. Cl.
USPC ..................................... 382/276; 382/298

(58) Field of Classification Search
USPC ............... 345/660; 348/E13.023, E13.065, 348/E13.066, 136, 137; 382/276, 298; 708/208, 290, 847; 715/800, 801, 815
See application file for complete search history.

(56) References Cited

FOREIGN PATENT DOCUMENTS

| JP | 2008-217547 | 9/2008 | | |
|---|---|---|---|---|
| JP | 2009-37301 | 2/2009 | | |
| JP | 2009-164865 | 7/2009 | | |
| KR | 10-2007-0073647 | 7/2007 | | |
| KR | 10-2007-0073647 A | * 10/2007 | ............. | G06T 15/00 |
| KR | 10-2008-0101998 | * 11/2008 | ............. | H04N 13/00 |
| KR | 10-2010-0019926 | 2/2010 | | |

* cited by examiner

*Primary Examiner* — Gregory F Cunningham
(74) *Attorney, Agent, or Firm* — Staas & Halsey LLP

(57) ABSTRACT

A view extrapolation apparatus and a view extrapolation method to generate images at a plurality of virtual points using a relatively small number of input images are disclosed. The view extrapolation apparatus and the view extrapolation method output a view at a reference point, the view at the reference point being formed of frames according to time, generating the frames of the view at the reference point to generate a resized frame, and generating an extrapolated view at a virtual point using the resized frame.

21 Claims, 10 Drawing Sheets

FIG. 7
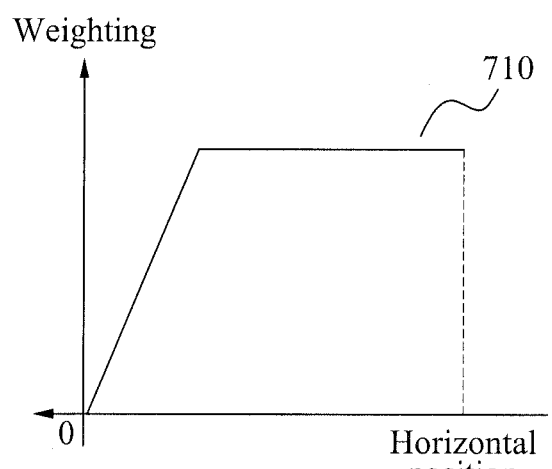
[Left extrapolation]
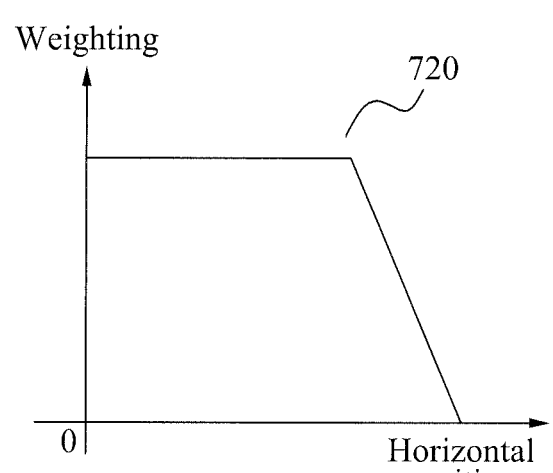
[Right extrapolation]

APPARATUS AND METHOD FOR GENERATING EXTRAPOLATED VIEW BASED ON IMAGE RESIZING

CROSS-REFERENCE TO RELATED APPLICATIONS

This application claims the priority benefit of Korean Patent Application No. 10-2010-0074908, filed on Aug. 3, 2010, in the Korean Intellectual Property Office, the disclosure of which is incorporated herein by reference.

BACKGROUND

1. Field

Example embodiments relate to an apparatus and a method for providing an extrapolated view at a point outside a photographed point.

2. Description of the Related Art

A three-dimensional (3D) image apparatus photographs a subject at two or more points to generate input views at the respective points.

An input view is formed of a sequence of frames. That is, the input view is formed of a predetermined number of frames output at per unit time, for example 30 frames per second (FPS).

Generally, a frame is a 3D image having color information and depth information about each of the pixels forming the frame. The depth information represents a distance between a photographed point and an object or a background corresponding to the pixels.

The color information about the pixels may be a binary representation to express color, for example, red, green, and blue (RGB).

The depth information about the pixels may be a binary representation to represent a value, for example, an integer number or a floating point, for a distance.

The 3D image apparatus may need to provide images at different points from the points of the input views to a user. Thus, the 3D image apparatus may generate an output view at a different point from the point of the input views based on the input views.

View interpolation denotes a process of generating an output view at a virtual point between the points of the input views. View interpolation may generate an output view image with reference to adjacent input view images at both sides of the virtual point. An output view generated by view interpolation is referred to as an interpolated view.

View extrapolation denotes a process of generating an output view at a point outside the points of the input views. That is, view extrapolation generates an output view at a left point from a point of a leftmost input view or generates an output view at a right point from a point of a rightmost input view. An output view generated by view extrapolation is referred to as an extrapolated view.

View extrapolation generates an output view image with reference to only one outermost input view. Thus, information used for view extrapolation is relatively small, and an image generated by view extrapolation is substantially deteriorated in quality compared with an image generated by view interpolation.

An interpolated view and an extrapolated view are also formed of a sequence of frames. A frame of an interpolated view or an extrapolated view is generally a 2D image.

SUMMARY

The foregoing and/or other aspects are achieved by providing an image apparatus including an input view generation unit to output a view at a reference point, the view at the reference point being formed of reference frames according to time, an importance calculation unit to calculate an importance of each of a plurality of regions forming the reference frames, a resizing unit to resize the reference frames based on the importance and to generate a resized frame, and an extrapolated view generation unit to generate an extrapolated view at a virtual point using the resized frame.

The image apparatus may obtain a plurality of views at a plurality of points, and the input view generation unit may output a view obtained at a leftmost or rightmost point among the plurality of points.

Each of the regions may include color information about pixels included in each of the regions, and the importance calculation unit may calculate the importance of each of the regions based on the color information about each of the regions.

The importance calculation unit may calculate the importance based on a gradient of the color information.

Each of the regions may include depth information about pixels included in each of the regions, and the importance calculation unit may calculate the importance based on the depth information.

Each of the regions may include information about whether pixels included in each of the regions are a foreground or a background, and the importance calculation unit may calculate the importance based on the information about whether the pixels are the foreground or the background.

The regions may be formed by vertically dividing the reference frames.

The importance calculation unit may calculate the importance based on a horizontal position of the regions in the reference frames.

The resizing unit may resize the reference frames by selecting at least one region in ascending order of importance among the plurality of regions and resizing a horizontal size of the selected at least one region.

The plurality of regions may be vertical lines of the reference frames.

The resizing unit may resize the reference frames by selecting at least one vertical line in ascending order of importance among the vertical lines and placing the same vertical line as the selected at least one vertical line next to the selected at least one vertical line.

The resizing unit may exclude a vertical line positioned within a predetermined distance from the selected vertical line from a subsequent selection.

The extrapolated view generation unit may generate the extrapolated view by transferring a position of a pixel in an integrated frame using color information and depth information about the integrated frame.

The extrapolated view generation unit may generate the extrapolated view by transferring the position of the pixel using a weighting proportionate to a distance between the reference point and the virtual point.

According to another aspect of example embodiments, a method of generating an extrapolated view including generating an input view to output a view at a reference point, the view at the reference point being formed of reference frames according to time, calculating an importance of each of a plurality of vertical lines forming the reference frames, resizing the reference frames based on the importance and generating a resized frame, and generating an extrapolated view at a virtual point using the resized frame.

The calculating of the importance may calculate the importance of each of the vertical lines based on at least one of a horizontal position of each of the vertical lines in the reference frames, color information about pixels included in each of the vertical lines, depth information about the pixels, and information about whether the pixels are a foreground or a background.

The resizing may generate the resized frame by selecting part of the plurality of vertical lines and placing the same vertical lines as the selected vertical lines next to the selected vertical lines.

The resizing may include arranging the plurality of vertical lines in ascending order of importance, selecting a first vertical line in the arrangement, and placing the same vertical line as the selected vertical line next to the selected vertical line, where a vertical line positioned within a predetermined distance from the selected vertical line is excluded in the arrangement so that the vertical line is excluded from the selection.

The generating of the extrapolated view may include warping an image to transfer a position of a pixel in the resized frame using a weighting proportionate to a distance between the reference point and the virtual point, color information about the resized frame, and depth information about the resized frame.

According to another aspect of example embodiments, a method of producing an extrapolated image from an input image having an image capture view point is disclosed which produces a motion estimate estimating a motion of the input image, produces an integrated image from at least one time wise successive image associated with the input image and the input image when the motion estimate is greater than or equal to a motion threshold, produces a resized image from the input image resized responsive to importance of regions of the input image when the motion estimate is less than the motion threshold and produces the extrapolated image having a virtual view point different from the capture view point from one of the integrated image and the resized image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 7 illustrates an importance weighting based on a direction of extrapolation and a horizontal position of a region according to example embodiments;

DETAILED DESCRIPTION

Figure 1:
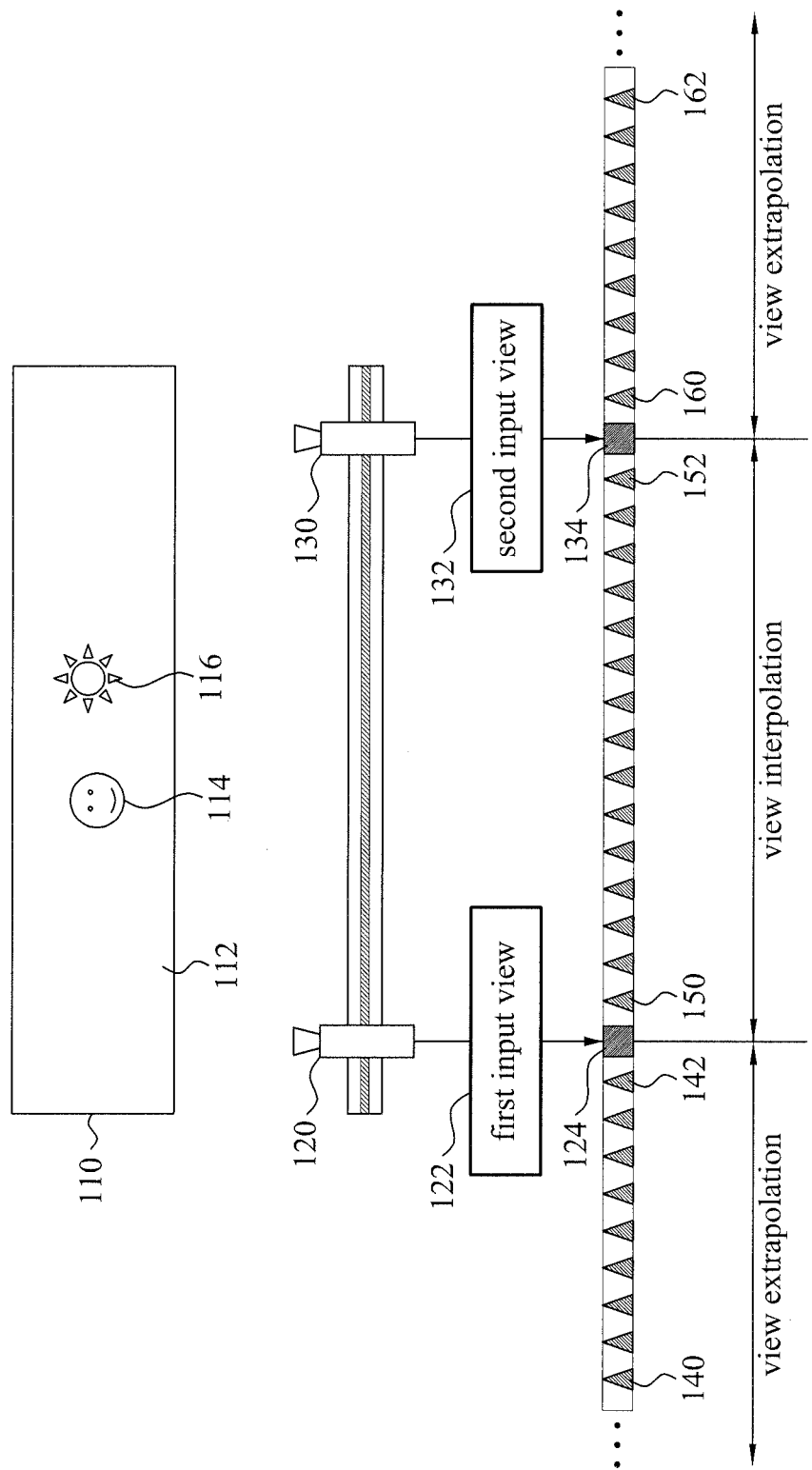
FIG. 1 illustrates a method of generating a view based on two input views according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of generating a view based on two input views according to example embodiments.

In the present embodiments, a subject 110 to be photographed is formed of a foreground and a background 112. The foreground includes a first object 114 and a second object 116.

Depending on an observer's viewpoint, a relative position of the first object 114 and the second object 116 to the background 112 is changed to a left or right side.

For example, a first input device 120, such as a camera, photographs the subject 110 at a first point, and a second input device 130, such as a camera, photographs the subject 110 at a second point.

Through photographing, the first input device 120 generates a first input view 122, and the second input device 130 generates a second input view 132. That is, the first input view 122 provides an image when a viewer sees the subject 110 from the first point, and the second input view 132 provides an image when the viewer sees the subject 110 from the second point.

The first input view 122 and the second input view 132 are formed of a sequence of frames. A frame 124 of the first input view 122 at a moment (that is, a point in time) t and a frame 134 of the second input view 132 at the moment t are shown in rectangles.

In order to provide an image of the subject 110 seen by the viewer from a virtual point excluding the first point and the second point, view extrapolation or view interpolation is performed using frames provided by the first view 122 and/or the second view 132.

An interpolated view and an extrapolated view are also formed of a sequence of frames.

In FIG. 1, triangles 140, 142, 150, 152, 160, and 162 represent frames of the interpolated view and frames of the extrapolated view at points where the respective triangles are positioned. The frames are frames at the moment or time t.

A leftmost input view, which is a view at a left point from a point of the first input view 122, is an extrapolated view. Further, a rightmost input view, which is a view at a right point from a point of the second input view 132, is an extrapolated view. That is, frames 140, 142, 160, and 162 are frames of the extrapolated views at the moment t.

A view at a point between points of the input views 122 and 132 is an interpolated view. That is, frames 150 and 152 are frames of the interpolated view at the moment t.

Figure 2:
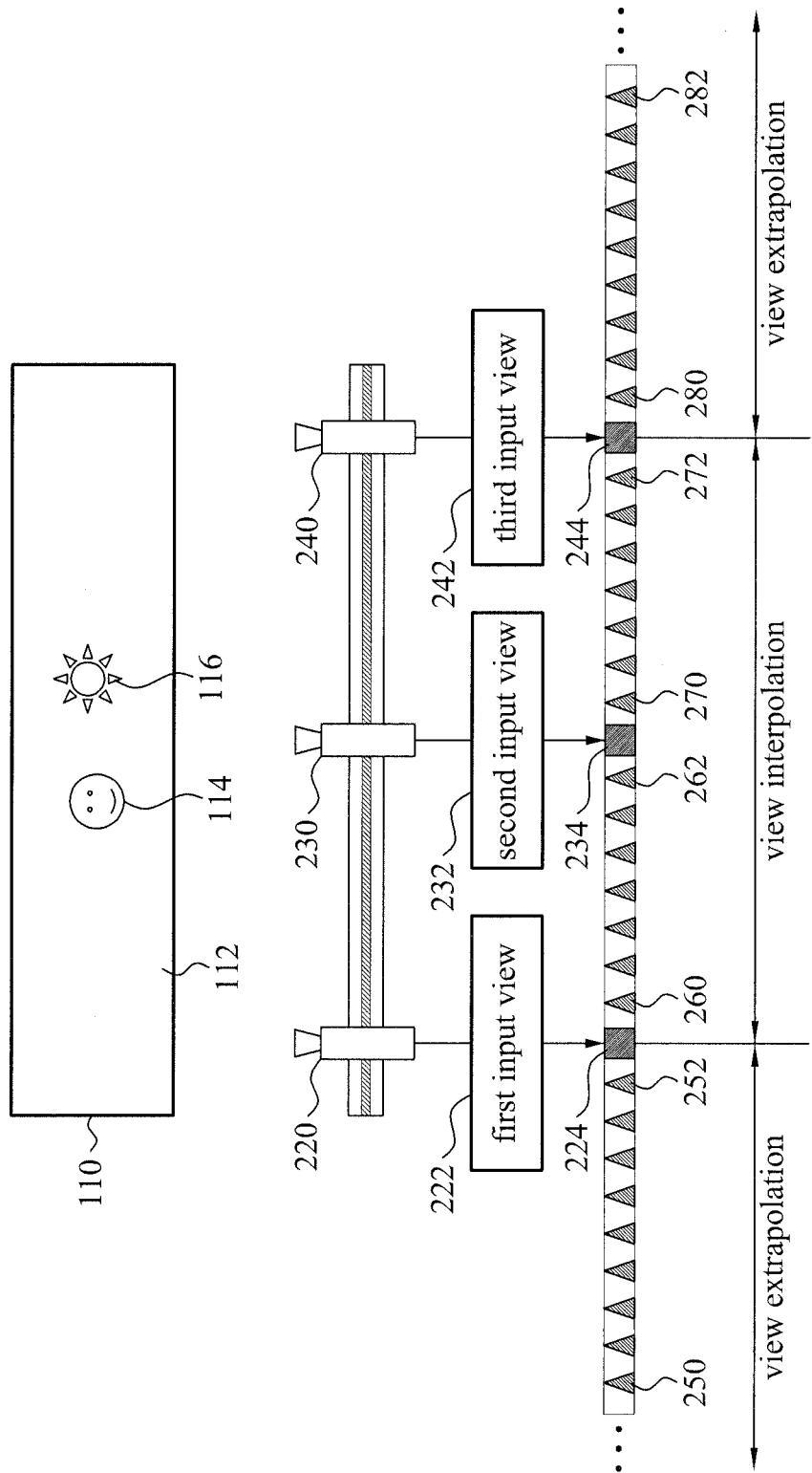
FIG. 2 illustrates a method of generating a view based on three input views according to example embodiments.

FIG. 2 illustrates a method of generating a view based on three input views according to example embodiments.

Input devices 220, 230, and 240 photograph a subject 110 at different points to generate input views 222, 232, and 242, respectively.

In order to provide an image of the subject 110 seen by a viewer from a different point from the points of the input devices 220, 230, and 240, view extrapolation or view interpolation is performed using frames provided by the views 222, 232, and 242 generated by the input devices 220, 230, and 240.

In FIG. 2, rectangles 224, 234, and 244 represent frames of the input views.

In FIG. 2, triangles 250, 252, 260, 262, 270, 272, 280, and 282 represent frames of an interpolated view and frames of an extrapolated view at points where the respective triangles are positioned.

A view at a left point from a point of a leftmost input view 222 is an extrapolated view. Further, a view at a right point from a point of a rightmost input view 242 is an extrapolated view. Frames 250, 252, 280, and 282 are frames of the extrapolated views at a moment t.

A view at a point between points of the input views 222, 232, and 242 is an interpolated view. Frames 260, 262, 270, and 272 are frames of the interpolated view at the moment t.

The interpolated view and the extrapolated views are also formed of a sequence of frames.

As described above with reference to FIGS. 1 and 2, based on N input views, M output views at points of the N input views and at different points from the points may be generated.

Figure 3:
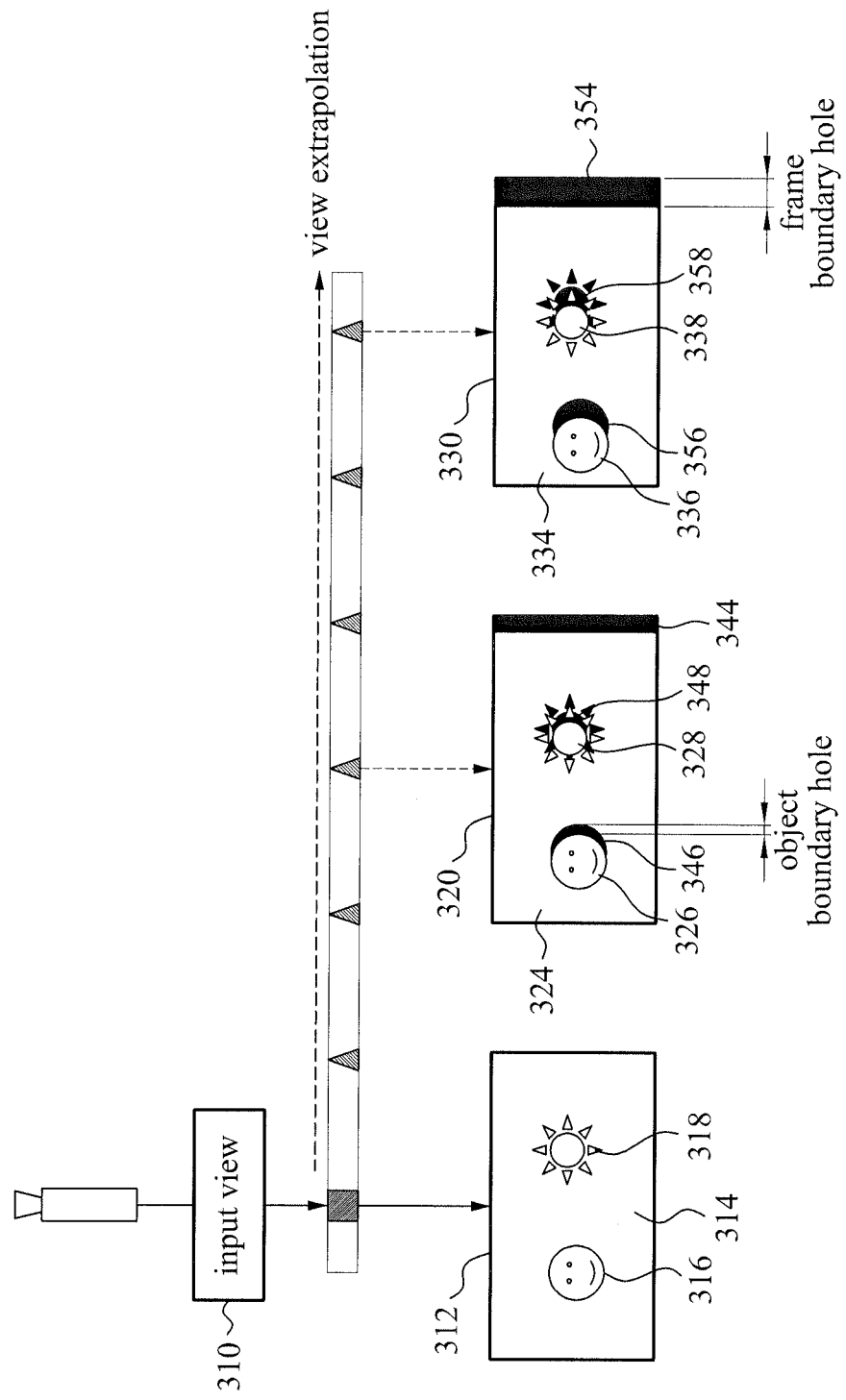
FIG. 3 illustrates a method of generating a frame of an extrapolated view according to example embodiments.

FIG. 3 illustrates a method of generating a frame of an extrapolated view according to example embodiments.

A sequence of frames is provided through an input view 310. FIG. 3 illustrates a frame 312 of the input view 310 at a moment t.

Based on the input view 310, a first extrapolated view and a second extrapolated view are generated through view extrapolation at right points from the input view 310.

A frame 320 of the first extrapolated view and a frame 330 of the second extrapolated view at the moment t are generated using the frame 312 of the input view 310.

The input view 310 is obtained by photographing the subject 110 of FIG. 1, and the frame 312 of the input view 310 includes a background 314, a first object 316, and a second object 318.

The frame 320 of the first extrapolated view also includes a background 324, a first object 326, and a second object 328.

A point of the first extrapolated view is positioned right of a point of the input view 310. Thus, the background 324, the first object 326, and the second object 328 in the frame 320 of the first extrapolated view are positioned left of those in the frame 312 of the input frame 310.

An extent to which the background 324 is positioned left depends on a distance from the point of the input view 310 to the background 324 and depends on a distance between the point of the input view 310 and the point of the first extrapolated view.

As described above, since the entire background 324 is moved to the left, the frame 320 of the first extrapolated view has a frame boundary hole 344 which is not filled with the frame 312 of the input view 310.

The objects 326 and 328 forming a foreground are also moved as the background 324 is moved. In addition, the objects 326 and 328 are moved further to the left than the background 324.

An extent to which the objects 326 and 328 are positioned further to the left than the background 324 depends on a distance from the point of the input view 310 to each of the objects 326 and 328 and depends on a distance between the point of the input view 310 and the point of the first extrapolated view.

The objects 326 and 328 are moved further to the left than the background 324, and thus the frame 320 of the first extrapolated view has object boundary holes 346 and 348 which are not filled with the frame 312 of the input view 310.

To generate an extrapolated view, a pixel is properly extrapolated in the frame boundary hole 354 and the object boundary holes 346 and 348.

The frame 330 of the second extrapolated view also has a frame boundary hole 354 and object boundary holes 356 and 358.

A point of the second extrapolated view is more distant from the point of the input view 310 than the point of the first extrapolated view. A background 334, a first object 336, and a second object 338 in the frame 330 of the second extrapolated view are positioned further to the left than the background 324, the first object 326, and the second object 328 in the frame 320 of the first extrapolated view.

The frame boundary hole 354 and the object boundary holes 356 and 358 in the frame 330 of the second extrapolated view are wider from side to side than the frame boundary hole 344 and the object boundary holes 346 and 348 in the frame 320 of the first extrapolated view.

Thus, more pixels are extrapolated in the frame boundary hole 354 and the object boundary holes 356 and 358 in the frame 330 of the secondary extrapolated view.

Figure 4:
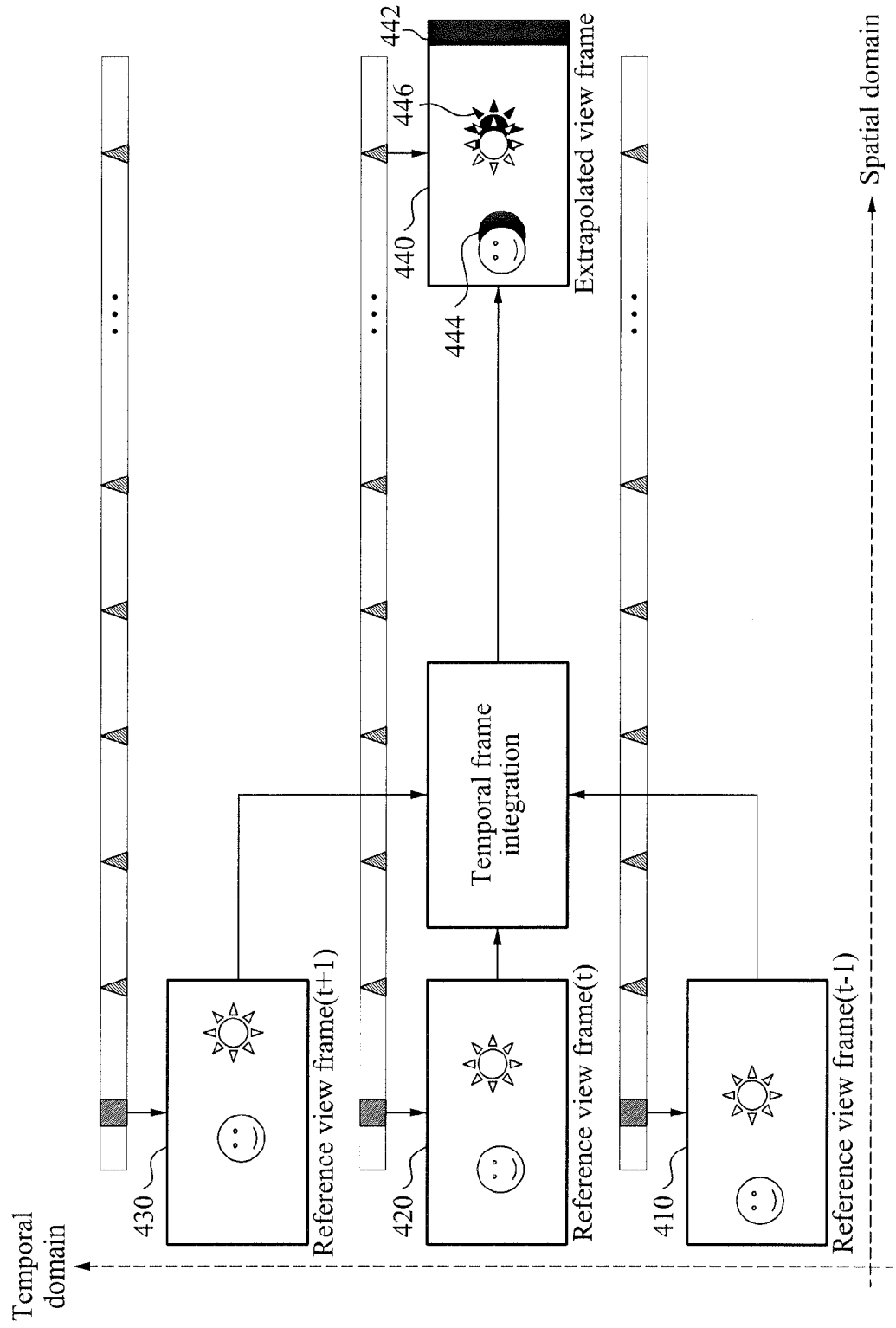
FIG. 4 illustrates a method of generating a frame of an extrapolated view using a plurality of frames of an input view according to example embodiments.

FIG. 4 illustrates a method of generating a frame of an extrapolated view using a plurality of frames of an input view according to example embodiments.

An input view used to generate the frame of the extrapolated view is referred to a reference view.

The reference view may be an input view at a leftmost point or an input view at a rightmost view among a plurality of input views.

A plurality of extrapolated views may be distinguished depending on a distance from the reference view. An x-axis representing a distance from the reference view to an extrapolated view is referred to as a spatial domain.

The reference view and the extrapolated view output a predetermined number of frames per unit time.

A y-axis representing a temporal order of the output frames is referred to a temporal domain.

That is, the spatial domain may be a spatial axis representing a distance between points of views based on the same moment. The temporal domain may be a time axis representing a temporal order of frames based on a unitary view.

When a frame 440 of an extrapolated view is generated using only a reference view frame 420 at a moment t, a background hole region 442 and object hole regions 444 and 446 are generated in the frame 440 of the extrapolated view. The background hole region 442 corresponds to the frame boundary holes 344 and 354. The object hole regions 444 and 446 correspond to the object boundary holes 346, 348, 356 and 358.

In order that pixels are properly extrapolated in the background hole region 442 and the object hole regions 444 and 446 to generate the adequate frame 440 of the extrapolated view, a previous reference view frame or a subsequent reference view frame is used in addition to the reference view frame 420 at the moment t.

In the present embodiments, for example, the previous frame 410 at t−1 and the subsequent frame at t+1 to the frame at the moment t and are used.

That is, a temporal succession of the three reference frame frames 410, 420, and 430 are used to generate the frame 440 of the extrapolated view at the moment t.

A background in the reference view frames 410, 420, and 430 is moved to the right over time. Thus, background data in the reference view frames 410 and 430 at the different moments t−1 and t+1 may be used to compensate for the background hole region 442 in the frame 440 of the extrapolated view.

Further, objects in the reference view frames 410, 420, and 430 are moved to the right in the frames over time. Thus, in the reference view frame 420 at the moment t, background data covered with an object may be obtained using background data in the reference view frames 410 and 430 at the different moments t−1 and t+1. The obtained background data, which was covered, may be used to compensate for the object hole regions 444 and 446 in the frame 440 of the extrapolated view.

That is, the plurality of reference view frames 410, 420, and 430 generate an integrated frame of the extrapolated view by temporal frame integration.

The integrated frame may display a larger image than the reference view frames 410, 420, and 430.

For example, in the present embodiments, view extrapolation generates frame information of an outer view according to a spatial direction using a current frame of the reference frame. A lack of the frame information may be found from frames in a temporal direction adjacent to the current frame of the reference view.

A plurality of previous frames or subsequent frames may be used to expand a size of a reconstructed portion by view extrapolation.

Figure 5:
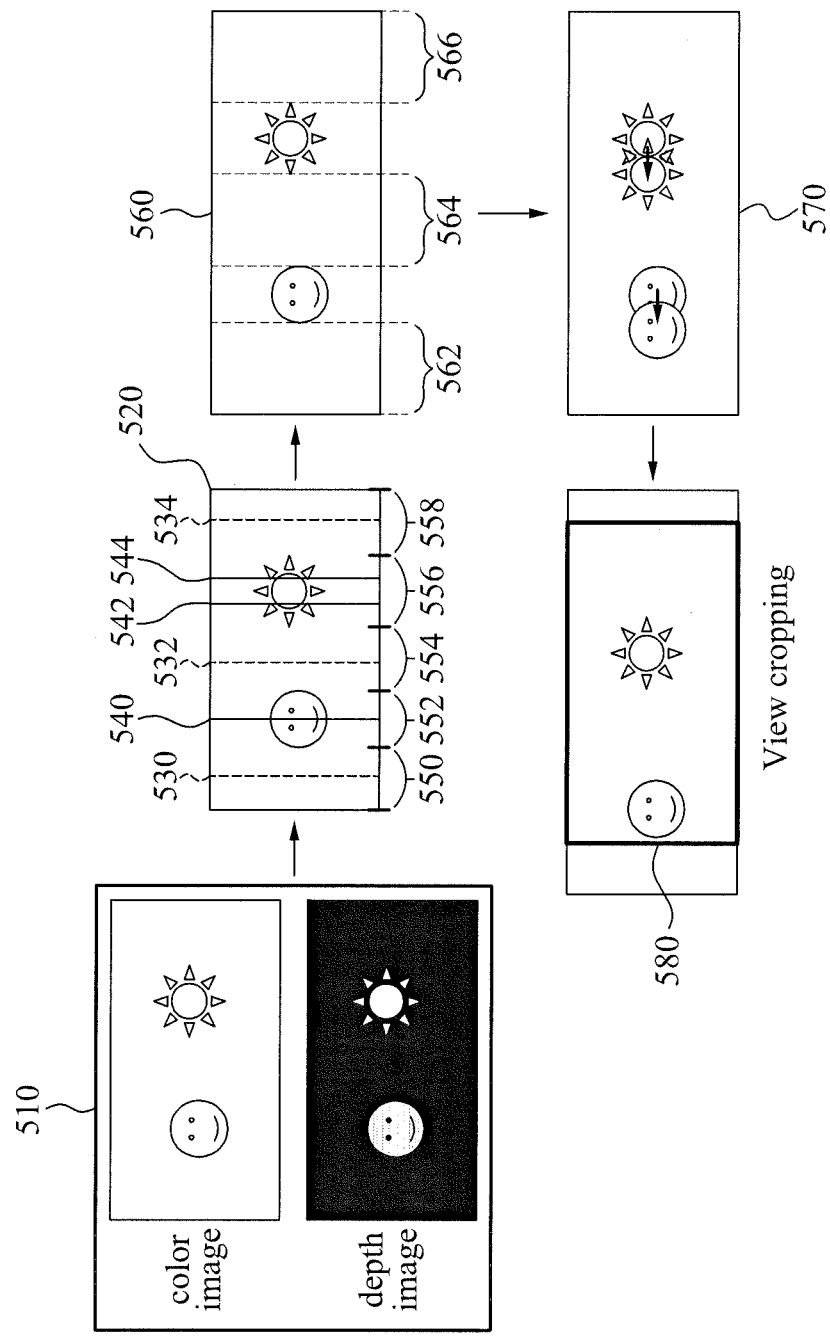
FIG. 5 illustrates a method of generating a frame of an extrapolated view by resizing a frame of an input view according to example embodiments.

FIG. 5 illustrates a method of generating a frame of an extrapolated view by resizing a frame of an input view according to example embodiments.

When a whole reference frame is resized at a uniform ratio, all regions in the reference frame are changed at the same ratio. When a viewer sees an image provided by an outmost input view and an image provided by the change as a left image and a right image, respectively, distortion may occur when the viewer perceives a 3D structure. Thus, an important region of an input image may be maintained in size, and only a relatively unimportant region may be resized in a horizontal direction.

FIG. 5 shows a reference view frame 510 at a moment t. The reference view frame 510 is generated by photographing the subject of FIG. 1. An input frame may include information about a color image 512 and information about a depth image 514.

A frame 520 is obtained via classification of lines that is sorting vertical lines forming the reference view frame 510 based on an importance.

The vertical lines are sorted into important lines and unimportant lines based on an importance. For example, lines having an importance greater than or equal to a predetermined threshold value are classified as important lines, and lines having an importance less than the threshold value are classified as unimportant lines.

An importance of a vertical line may be determined based on color information and depth information about pixels, the pixels forming the vertical line. A method of calculating an importance of each vertical line is described hereinafter.

In the present embodiments, vertical lines passing through the objects 114 and 116 of the subject 110 of FIG. 1 are classified as important lines, and vertical lines not passing through the objects 114 and 116 are classified as unimportant lines. Part of the unimportant lines 530, 532, and 534 are shown as dotted lines, and part of the important lines 540, 542, and 544 are shown as solid lines.

A frame is formed of a plurality of regions 550, 552, 554, 556, and 558. The regions are sorted into important regions 552 and 556 and unimportant regions 550, 554, and 558.

The important regions 552 and 556 may be a region including the important lines, and the unimportant regions 550, 554, and 558 may be a region including the unimportant lines. Here, the regions are formed by dividing the reference frame vertically.

Further, one unimportant region may be formed by either only a single unimportant line, or a plurality of successive unimportant lines. A resized frame 560 is generated by resizing the reference frame 510 or the line classified frame 520 based on an importance of the line classified frame 520.

The unimportant regions 550, 554, and 558 in the line classified frame 520 are expanded horizontally to generate resized unimportant regions 562, 564, and 566. The resized frame 560 may be generated due to the resized unimportant regions 562, 564, and 566.

The resized frame 560 may have the same size as the above integrated frame.

Various image enlargement algorithms may be applied to the unimportant regions 550, 554, and 558 to generate the resized unimportant regions 562, 564, and 566.

An importance of an unimportant region may be calculated based on an average importance of vertical lines forming the unimportant region, and an unimportant region to be resized may be selected in ascending order of calculated importance.

The unimportant regions 550, 554, and 558 are resized at the same ratio to generate the resized frame 560.

The resized frame 560 may be generated by repeating an unimportant line.

Repetition of an unimportant line denotes placing the same vertical line as the unimportant line straightly on either a left side or right side of the unimportant line. Due to the placing, vertical lines positioned on either the left side or the right side of the unimportant line are moved away by one pixel, and a frame increases in size by 1 pixel in a horizontal direction is generated.

When a size difference in the horizontal direction between the resized frame 560 and the reference frame 510 is n, n unimportant lines are selected, and the selected unimportant lines are repeated to generate the resized frame 560.

The unimportant lines may be n vertical lines having a relatively low importance among the plurality of vertical lines forming the reference frame 510.

The n vertical lines may be selected in ascending order of importance. For example, n vertical lines having the least importance may be selected for repetition.

When one unimportant line is repeated, a vertical line positioned within a predetermined distance from the repeated line in the horizontal direction may be excluded from repetition. For example, when a vertical line in a horizontal position 2 is repeated, vertical lines in horizontal positions 1 and 3 may be excluded from repetition regardless of an importance. Accordingly, a particular portion may not be excessively expanded.

An unimportant region is generally an undistinguishing region or a region having a small depth value, such as a background. When the resized frame 560 is generated by the above method, the unimportant region is resized, and the resized unimportant region replaces a frame boundary hole.

Moreover, an important region, such as an object region, is not resized, and thus the important region provides the same sense of depth as before the resized frame is generated.

An image warped frame 570 is generated based on the resized frame 560.

The image warped frame 570 is formed by changing a position of a pixel in an image based on a difference in a point between the reference view and the extrapolated view.

The position of the pixel is changed based on a depth of the pixel. For example, a closer object may be moved more to the left depending on the depth.

The image warped frame 570 is cropped in the same size as the original reference frame, so that a frame 580 of the extrapolated view is generated.

Figure 6:
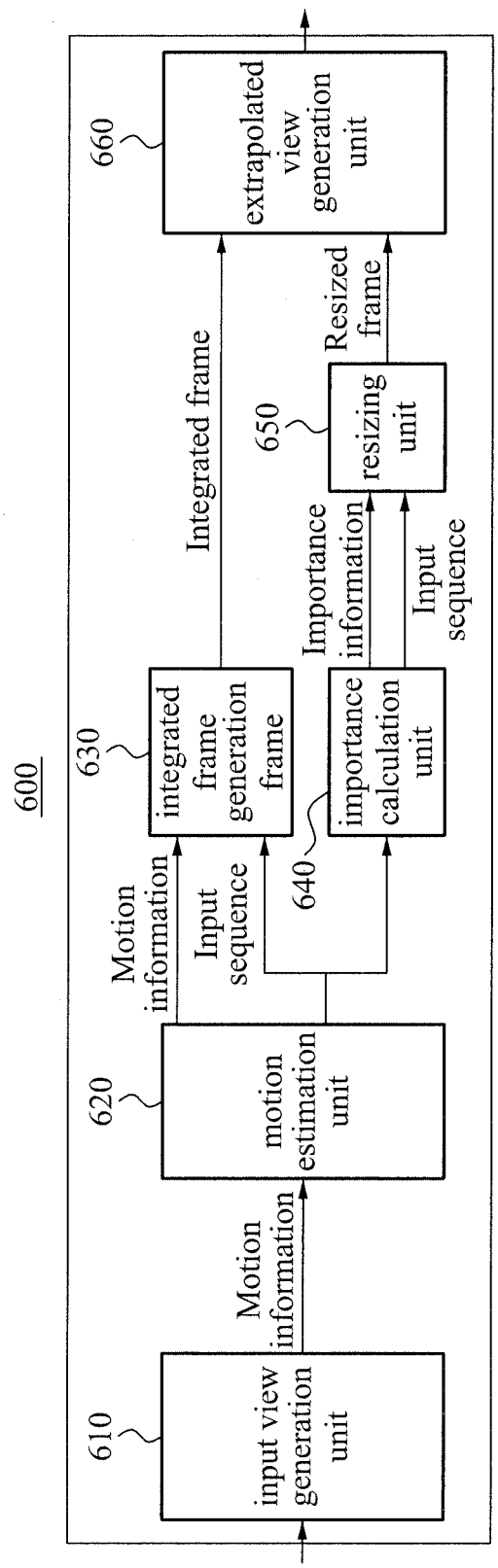
FIG. 6 illustrates a configuration of an image apparatus according to example embodiments.

FIG. 6 illustrates a configuration of an image apparatus according to example embodiments and which may be embodied in a computer.

The image apparatus 600 includes an input view generation unit 610, an importance calculation unit 640, a resizing unit 650, and an extrapolated view generation unit 660.

The image apparatus 600 may further include a motion estimation unit 620 and an integrated frame generation unit 630.

The input view generation unit 610 generates and outputs an input sequence. The input sequence denotes a view at a reference point, described above. The input sequence is formed of a temporal succession of frames.

The frames forming the input sequence are referred to as reference frames. A reference frame (t) denotes a reference frame at a moment t. Likewise, an integrated frame (t) denotes an integrated frame at the moment t, and a resized frame (t) denotes a frame resized at the moment t.

The reference point generally refers to a point of a leftmost input view or a rightmost input view among a plurality of input views to the image apparatus 600.

One pixel may be expressed in color and in depth. The input sequence may includes a color sequence representing information about colors of pixels forming a frame and a depth sequence representing information about depth of the pixels.

The motion estimation unit 620 is provided with the input sequence from the input view generation unit 610 and estimates motion of the reference frame (t) in a frame unit. The motion estimation unit 620 generates and outputs motion information representing the estimated motion in the frame unit.

In order to estimate the motion, the motion estimation unit 620 uses information about adjacent frames to the reference frame (t) in a temporal direction or frames in temporal order, for example, a previous frame (t−1) or a subsequent frame (t+1) to the reference frame (t).

The motion estimation unit 620 may estimate motion using color information and depth information about reference frames, or estimate whether the current reference frame (t) is moved with respect to the previous reference frame (t−1) or the subsequent reference frame (t+1) or estimate a degree of movement by combining the color information and the depth information.

The motion estimation unit 620 may generate a global motion vector of the reference frame (t) as the motion information.

The global motion vector is a vector representing motion of a whole area of a plurality of frames in the input sequence according to time.

The global motion vector represents an extent of motion of the whole current reference frame (t) with respect to the previous reference frame (t−1) or the subsequent reference frame (t+1).

For example, when a camera photographing a subject is moved or panned at a rapid rate during the photographing, the whole subject is also moved. Here, the global motion vector has a great value.

There are various methods of estimating global motion in a frame unit. For example, the motion estimation unit 620 detects a point where a sum of absolute difference (SAD) is minimal in a spatial region to generate a global motion vector.

Alternatively, the motion estimation unit 620 may generate a global motion vector using phase correlation in a frequency region.

The following Equation 1 illustrates an example of calculating a global motion vector in a frame unit using an SAD in the spatial region.

$$MV_{global}(i, j) = \operatorname*{argmin}_{x,y}(\alpha \cdot SAD(I^{t}_{i,j}, I^{t-n}_{i+x,j+y}) + \beta \cdot SAD(D^{t}_{i,j}, D^{t-n}_{i+x,j+y}))$$ [Equation 1]

Here, x and y denotes a position of a pixel. Due to limited calculation ability, x and y may be limited within a designated search range of $(-S_x, S_x)$, $(-S_y, S_y)$.

$\alpha$ denotes an SAD weighting with respect to color, and $\beta$ denotes an SAD weighting with respect to depth.

Since a global vector is calculated, i and j denote a whole frame.

I denotes a color value of an image displayed by a frame. $I^t$ denotes a color value of an image displayed by the current frame (t), and $I^{t-n}$ denotes a color value of an image displayed by a previous frame (t−n) moved by n from the current frame (t) in the temporal direction. An $SAD(I^t_{i,j}, I^{t-n}_{i+x,j+y})$ is a color SAD between the current frame (t) and a frame moved by (x, y) from the previous frame (t−n).

When n is a negative number, an object of comparison is a subsequent frame as opposed to a previous frame.

D is a depth value of an image displayed by a frame. $D^t$ denotes a depth value of the image displayed by the current frame (t), and $D^{t-n}$ denotes a depth value of the image displayed by the previous frame (t−n) moved by n from the current frame (t) in the temporal direction. An $SAD(I^t_{i,j}, I^{t-n}_{i+x,j+y})$ is a depth SAD between the current frame (t) and a frame moved by (x, y) from the previous frame (t−n).

Thus, $MV_{global}(i, j)$ is obtained from x and y which minimize a weighted sum of a color SAD and a depth SAD.

When a motion is included in a frame unit, such as panning or zooming, a hole generated in an extrapolation may be reconstructed using information about a temporal succession of a plurality of frames.

When a motion is absent from a frame unit, information additionally used for view extrapolation is limited.

Thus, when the information is limited, occurrence of image deterioration may need reducing in an extrapolated point in a frame generated by an extrapolation.

An unimportant region among regions in a reference frame is resized to resize the reference frame, and the resized frame is used to compensate for the extrapolated point.

The image apparatus 600 may determine whether to use an integrated frame or a resized frame when the extrapolated view generation unit 650 generates an extrapolated view based on the motion in the frame unit, for example, a global motion vector.

For example, when motion of the reference frame (t) in a frame unit has a threshold greater than or equal to a predetermined value, the integrated frame generation unit 630 may generate an integrated frame (t), and the extrapolated view generation unit 660 may generate an extrapolated view using the generated integrated frame.

For example, when the motion of the reference frame (t) in a frame unit has a threshold less than or equal to a predetermined value, the importance calculation unit 640 and the resizing unit 650 may generate a resized frame (t), and the extrapolated view generation unit 660 may generate an extrapolated view using the generated resized frame.

The integrated frame generation unit 630 generates an integrated frame by integrating a plurality of successive frames of the view at the reference point generated by the input view generation unit 610 in the same method as described with reference to FIGS. 4 and 5.

The plurality of frames may include color information and depth information about an image, and the integrated frame may include color information and depth information about an image.

The integrated frame generation unit 630 may generate the integrated frame based on the motion information generated by the motion estimation unit 620.

The integrated frame generation unit 630 receives the input sequence from the input view generation unit 610 or the motion estimation unit 620 and receives the motion information from the motion estimation unit 620. The motion information may be included in the input sequence and transmitted.

The integrated frame generation unit 630 may generate the integrated frame (t) of the moment t using information about the reference frame (t) at the moment t, information about a previous or subsequent frame to the reference frame (t), and the motion information.

The integrated frame generation unit 630 may compensate for a frame boundary hole and an object boundary hole in the integrated frame using the information about the reference frame (t) at the moment t, the information about the previous or subsequent frame to the reference frame (t), and the motion information.

The integrated frame generation unit 630 may separate a background from a foreground in a frame using the depth information.

For example, when the depth information represents a depth image, the integrated frame generation unit 630 may determine pixels having a depth value greater than or equal to a predetermined reference value as a foreground that is a region where an object is positioned, among pixels forming the depth image, and determine pixels having a depth value less than the predetermined reference value as a background.

The integrated frame generation unit 630 may generate an integrated background frame by integrating a plurality of frames of the divided background.

When the reference frame (t) includes a foreground region where the object is positioned, a background of the foreground region is not viewed using only information about the reference frame (t).

The integrated frame generation unit 630 may generate an integrated background frame (t) using background information about temporally adjacent frames to the reference frame (t) and fill the object boundary hole in the integrated frame (t) with the generated integrated background frame (t).

The importance calculation unit 640 calculates an importance of each of a plurality of regions forming the reference frame (t), as described above with reference to FIG. 5.

For example, the importance calculation unit 640 may calculate an importance of each of the plurality of regions by receiving the reference view frame 510 and generating the line classified frame 520.

The importance calculation unit 640 is provided with the input sequence from the input view generation unit 610 and the motion estimation unit 620.

The regions may be a plurality of adjacent vertical lines or a unitary vertical line in the reference frame (t).

An importance of each of the regions may be calculated based on color information about pixels included in each of the regions.

For example, the importance calculation unit 640 may use a particular importance calculation function having a color value of a pixel as one of input values.

For example, the importance calculation unit 640 may detect a particular point, such as an edge, from the color value of the pixel and calculate an importance of each region based on a number of particular points in the region.

For example, the importance calculation unit 640 may calculate an importance based on a gradient of the color information. A color gradient of a pixel denotes a degree to which a color of the pixel is changed as compared with adjacent pixels. A pixel having a high gradient may be visually recognized properly or receive visual attention and have a high importance.

An importance of each region may be calculated based on depth information about pixels included in the region.

For example, the importance calculation unit 640 may use a particular importance calculation function having a depth value of a pixel as one of input values.

For example, the importance calculation unit 640 may detect a particular point, such as an edge, from the depth value of the pixel and calculate an importance of each region based on a number of particular points in the region.

For example, the importance calculation unit 640 may determine pixels classified as a background based on the depth information to have a low importance and determine pixels classified as a foreground or an object to have a high importance.

The reference frame (t) may include information about a foreground and a background.

For example, the input sequence may provide information about an object and information about a background separately. Alternatively, segmentation is applied to an input frame, so that the foreground and the background may be separated. Here, the importance calculation unit 640 may use a number of foregrounds and a number of backgrounds included in a region as a measure and determine an importance of the region.

An importance of each region may be calculated based on a horizontal position of the region in the reference frame (t).

For example, the importance calculation unit 640 may determine a region in a middle position to have a high importance and determine a region in an edge position to have a low importance.

For example, the importance calculation unit 640 may determine an importance based on an extrapolation direction and a horizontal position of a region. An example of determining the importance based on the extrapolation direction and the horizontal position of the region will be described with reference to FIG. 7.

The importance calculation unit 640 may calculate an importance of each region based on at least one of the color information, the depth information, whether there is a background, and the horizontal position.

The region may be a vertical line in a frame. Here, the importance calculation unit 640 may calculate an importance of each vertical line.

An example of calculating the importance of each vertical line in the reference frame (t) will be described with reference to FIG. 8.

The resizing unit 650 resizes the regions forming the reference frame (t) to resize the reference frame (t), as described above with reference to FIG. 5. The resizing unit 650 resizes the reference frame (t) to generate the resized frame (t) 570.

The resizing unit 650 may classify the regions into important regions and unimportant regions.

The resizing unit 650 may classify regions having a low importance at a predetermined number or at a predetermined ratio as unimportant regions and classify important regions other than the regions.

The resizing unit 650 may classify regions having an importance lower than a predetermined value as unimportant regions and classify regions other than the regions as important regions.

The resizing unit 650 may resize at least one of unimportant regions to resize the reference frame (t).

The resizing unit 650 may expand unimportant regions at the same ratio in the horizontal direction to resize the reference frame (t). The ratio is determined based on a horizontal size ratio of the reference frame (t) to the resized frame (t).

The resizing unit 650 may expand at least one of unimportant regions at a predetermined ratio in the horizontal direction to resize the reference frame (t). The resizing unit 650 may arrange a plurality of unimportant regions in ascending order of importance, and select and expand at least one unimportant region having the lowest important at the predetermined ratio.

When a region is vertical lines in a frame, the resizing unit 650 may select vertical lines having a lower importance as many as pixels used to resize and insert the selected vertical lines in the reference frame (t) to generate the resized frame (t). An inserted position is straight right or left to the selected vertical lines, which means the selected vertical lines are repeated twice in the frame.

The resizing unit 650 may limit a minimum distance between the selected vertical lines so that vertical lines within a predetermined distance are not intensively repeated. That is, when vertical lines are selected based on an importance, a vertical line positioned within the predetermined distance horizontally from the selected vertical lines may be excluded from selection regardless of an importance.

The resizing unit 650 may arrange vertical lines forming a frame in ascending order of importance. Here, the resizing unit 650 selects a vertical line having the lowest importance among the arranged vertical lines and inserts the same vertical line as the vertical line in the reference frame (t). The inserted vertical line is excluded from subsequent selection. Further, the resizing unit 650 selects vertical lines as many as used for resizing in ascending order of importance.

The resizing unit 650 may exclude a vertical line within the predetermined distance from the selected vertical line from a subsequent selection regardless of an importance. The exclusion prevents vertical lines within a predetermined range from being repeated a plurality of times.

An example of generating the resized frame (t) 560 based on an importance of vertical lines in the reference frame (t) will be described with reference to FIG. 8.

The extrapolated view generation unit 660 generates an extrapolated view at a virtual point using an input frame. The input frame is an integrated frame or a resized frame.

The input frame (t) may be a resized frame in the horizontal direction as compared with the reference frame (t). Further, the input frame (t) may include a color image and a depth image.

The extrapolated view generation unit 660 may transfer a position of a pixel in the input frame using color information and depth information about the input frame (t) to generate a frame (t) of an extrapolated view.

The extrapolated view generation unit 660 may generate an image at the virtual point of the extrapolated view through image warping using the input frame.

The extrapolated view generation unit 660 may transfer the position of the pixel using a weighting proportionate to a distance between the point of the reference view to the virtual point of the extrapolated view.

The following Equation 2 illustrates an example of generating a view at the virtual point.

$$I_{extrapolated\ view}(x') = I_{reference\ view}(x + \alpha \cdot d) \quad \text{[Equation 2]}$$

Here, $I_{reference\ view}$ is a color value of an image displayed by the input frame, and $I_{extrapolated\ view}$ is a color value of an image displayed by the frame of the extrapolated view.

x and x' denote a coordinate value of a pixel, and d denotes a disparity calculated from a depth value of the image displayed by the input frame.

When an object having a predetermined depth is photographed into a plurality of views, pixels corresponding to the object have different relative positions with respect to a background in frames of the views. The extrapolated view generation unit 660 may calculate a disparity between the positions using depth values of the pixels.

$\alpha$ is a weighting value proportionate to the distance.

A position of a pixel is transferred in the above manner, so that an image is generated. The extrapolated view generation unit 660 may crop the generated image based on an input resolution that is a resolution of a frame of the reference view and generate a final view extrapolated image in, which a frame boundary region is compensated for.

The extrapolated view generation unit 660 sequentially outputs frames of the generated extrapolated view according to time to generate and output an extrapolated sequence.

The components of the image apparatus 600 described above, which are the input view generation unit 610, the motion estimation unit 620, the integrated frame generation unit 630, the importance calculation unit 640, the resizing unit 650, and the extrapolated view generation unit 660, may be independent hardware devices.

Functions of the above components 610 to 660 may be performed by a single controller (not shown). Here, the controller may be a single or a plurality of computer processors. The components 610 to 660 may be services, processes, threads, or modules performed by the controller.

FIG. 7 illustrates an importance weighting based on a direction of extrapolation and a horizontal position of a region according to example embodiments.

A left extrapolation weighting 710 illustrates an importance weighting on a y-axis with respect to a horizontal position of a region on an x-axis when a point of an extrapolated view is on a left side of a point of a reference view.

A right extrapolation weighting 720 illustrates an importance weighting on a y-axis with respect to a horizontal position of a region on an x-axis when the point of the extrapolated view is on a right side of the point of the reference view.

When view extrapolation is performed at a right point from a point of an input view, a right frame boundary hole is compensated for by a view extrapolation method. Thus, resizing is applied mainly to right regions rather than left regions.

In right extrapolation, left regions in a frame have a relatively high weighting, and right regions in the frame have a relatively low weighting. Thus, when other conditions are the same, the left regions in the frame have a relatively high importance, and the right regions have a relatively low importance.

In left extrapolation, regions have a weighting in an opposite manner to the above description.

When a region is a vertical line, the vertical line has a weighting based on a direction of extrapolation and a horizontal position of the vertical line as described above.

Figure 8:
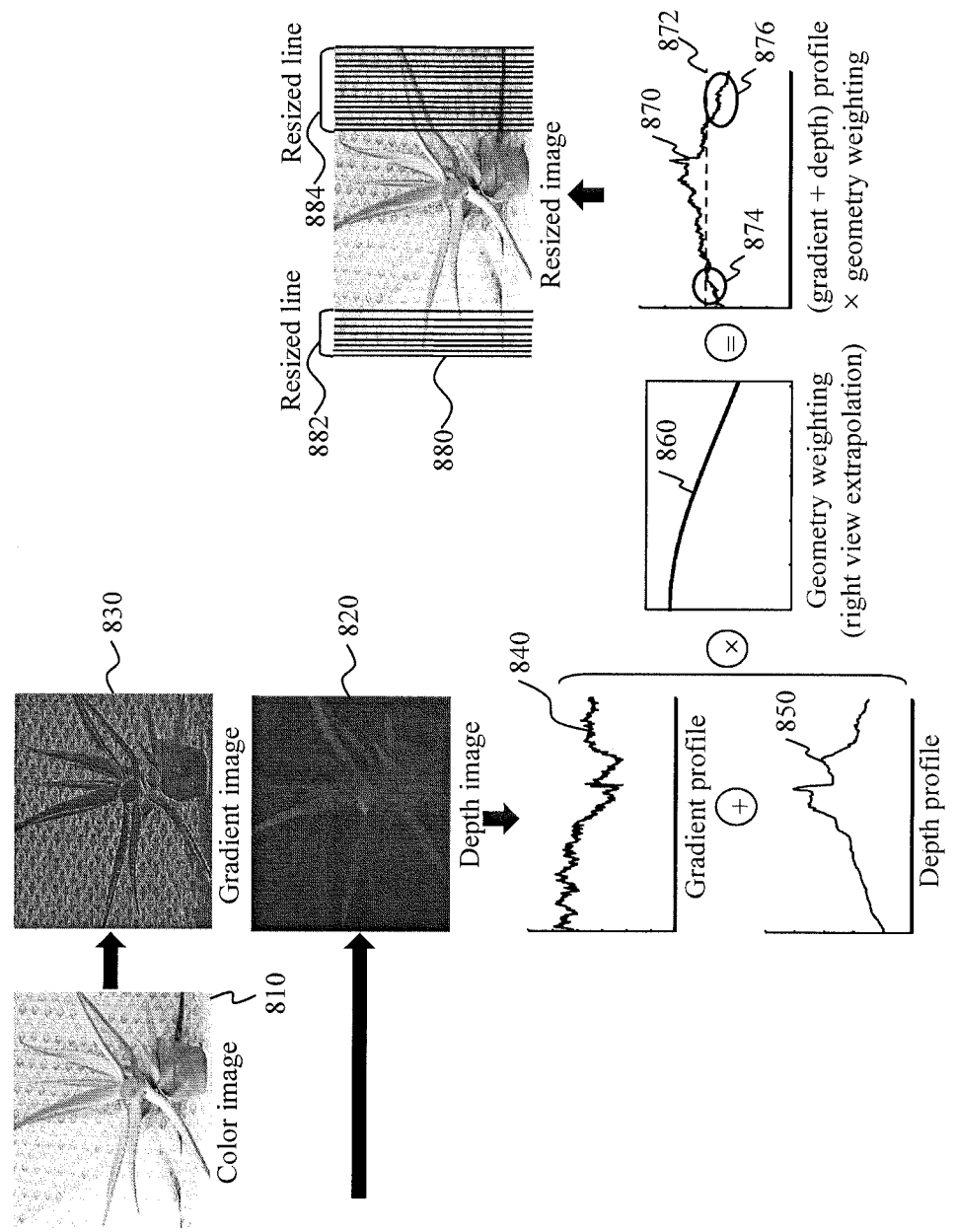
FIG. 8 illustrates a method of generating a frame resized based on an importance of a vertical line according to example embodiments.

FIG. 8 illustrates a method of generating a resized frame according to example embodiments.

FIG. 8 shows a color image 810 and a depth image 820 of a reference frame.

A color gradient image 830 may be generated based on the color image 820.

A gradient profile 840 illustrates an average value of gradients of pixels included in each of vertical lines forming the reference frame with respect to the vertical line. In a gradient profile graph, an x-axis represents a horizontal position of a vertical line, and a y-axis represents an average value of gradients.

Generally, a pixel having a higher gradient is properly recognized visually. Thus, a vertical line including more pixels having a higher gradient, that is, a vertical line having a high average value of gradients, has a higher possibility of having a high importance.

A depth profile 850 illustrates an average depth value of pixels included in each of vertical lines forming the reference frame with respect to the vertical line. In a depth profile graph, an x-axis represents a horizontal position of a vertical line, and a y-axis represents an average depth value.

A pixel having a high depth value is a pixel close to a reference point. The pixel having the high depth value has a higher possibility of displaying a foreground or an object. Thus, a vertical line including more pixels having a high depth value, that is, a vertical line having a higher average depth value, has a higher possibility of having a high importance.

A position weighting 860 denotes a weighting according to a horizontal position of a vertical line in a frame.

The weighting may be changed depending on whether a virtual point of an extrapolated view to be generated is on a left side or a right side of the reference point. The position weighting 860 in the present embodiments denotes a weighting when the point of the extrapolated view is on the right side of the point of the reference view.

An importance of a vertical line 870 may be calculated based on the gradient profile 840, the depth profile 850, and the position weighting 860.

For example, the importance of the vertical line 870 may be a value obtained by multiplying a sum of a gradient value of each vertical line and a depth value by a position weighting.

Vertical lines having an importance 870 greater than or equal to a predetermined threshold value 872 are classified as important vertical lines, and vertical lines having an importance 870 less than the predetermined threshold value 872 are classified as unimportant vertical lines.

Regions 874 and 876 formed of unimportant lines may be classified as unimportant regions.

Based on a calculated importance, a resized image 880 is generated.

The resized image 880 may be generated by enlarging the unimportant regions 874 and 876 in the horizontal direction. Vertical lines in the unimportant regions are repeated to generate the horizontally expanded unimportant regions.

The resized image 880 may be generated by repeating unimportant lines in the frame. That is, the resized image 880 may be generated by resizing unimportant lines. The resizing may be expanding unimportant lines twice in the horizontal direction.

Figure 9:
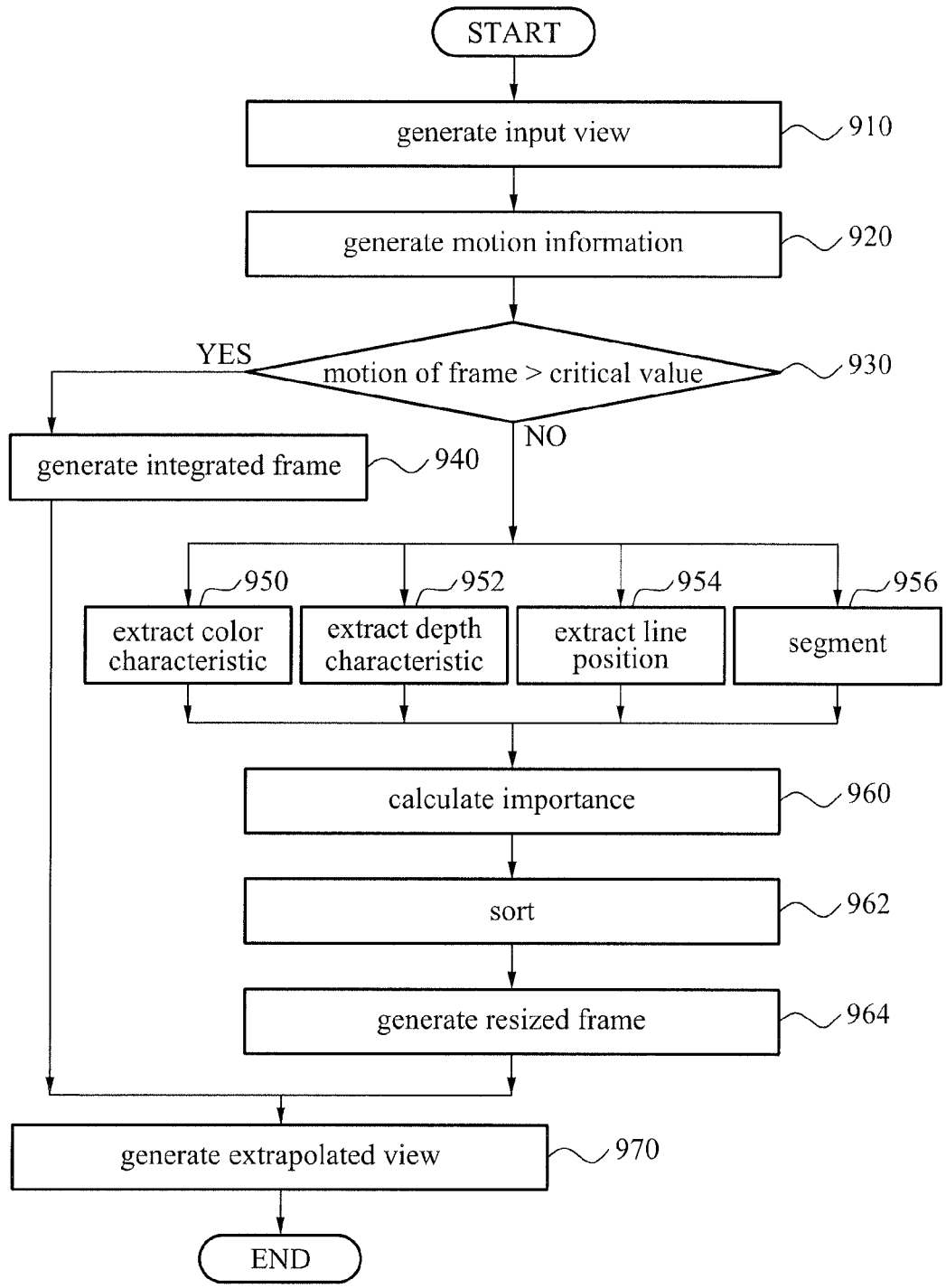
FIG. 9 is a flowchart illustrating a method of generating an extrapolated view according to example embodiments.

FIG. 9 is a flowchart illustrating a method of generating an extrapolated view according to example embodiments.

In operation 910, an input view is generated. The input view outputs a view at a reference point, and the view at the reference point is formed of frames according to time.

In operation 920, motion information about a plurality of successive frames of the view at the reference point according to time is generated.

In operation 930, a degree of motion in a reference frame (t) is compared with a threshold value based on the motion information.

When the motion in the reference frame (t) is greater than the threshold value, operation 940 is performed to generate an integrated frame.

Operations 920, 930, and 940 are selective, and thus operations 950, 952, 954, and 956 may be performed subsequently to operation 910.

When the motion in the reference frame (t) is less than or equal to the threshold value, operations 950, 952, 954, 956, 960, 962, and 964 are performed to generate a resized frame.

In operation 940, the plurality of frames are integrated into the integrated frame. The motion information may be used to generate the integrated frame.

In operations 950, 952, 954, and 956, values used to calculate an importance of vertical lines forming the reference frame (t) are calculated. Operations 950, 952, 954, and 956 are optional and thus, fewer than all operations 950, 952, 954, and 956 may be performed.

In operation 950, a color characteristic of pixels included in a vertical line is extracted, and a gradient based on the color characteristic is extracted.

In operation 952, a depth characteristic of the pixels included in the vertical line is extracted, and a depth value based on the depth characteristic is extracted.

In operation 954, a horizontal position of the vertical line and a weighting based on the horizontal position are extracted.

In operation 956, segmentation is performed on the pixels included in the vertical line. That is, operation 956 determines whether the pixels included in the vertical line display a background or a foreground.

In operation 960, an importance of each of the vertical lines is calculated based on at least one of the horizontal position of each vertical line, color information about pixels included in the vertical line, depth information about the pixels included in the vertical line, and segmentation results of the pixels included in the vertical lines.

In operation 962, each vertical line is classified as an important line or an unimportant line based on an importance of the vertical line.

In operation 964, a resized frame is generated based on the importance of each vertical line or classification by the importance. A method of generating the resized frame according to example embodiments will be described with reference to FIG. 10.

In operation 970, an extrapolated view at a virtual point is generated using an input frame.

An input frame is the integrated frame generated in operation 940 or the resized frame generated in operation 964.

The extrapolated view may be generated by transferring a position of a pixel in the input frame using a weighting proportionate to a distance between the reference point and the virtual point, color information about the input frame, and depth information about the input frame.

The technical content according to the example embodiments described above with reference to FIGS. 1 to 8 may be applied to the present embodiments. Thus, detailed description is omitted.

Figure 10:
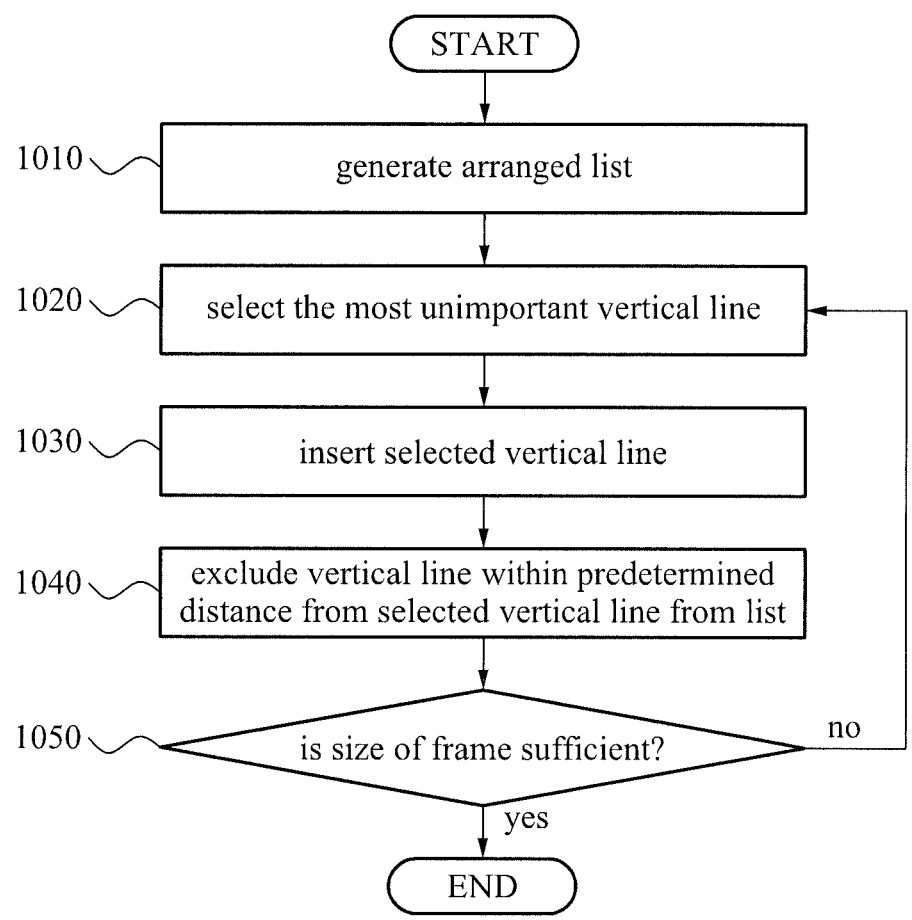
FIG. 10 is a flowchart illustrating a method of generating a resized frame according to example embodiments.

FIG. 10 is a flowchart illustrating a method of generating a resized frame according to example embodiments.

In operation 1010, a plurality of vertical lines forming a reference frame are arranged in ascending order of importance. Further, a list of the arranged vertical lines is generated.

In operation 1020, a first vertical line in the list, that is a vertical line having the lowest importance, is selected.

In operation 1030, the selected vertical line is repeated in a frame. That is, the same vertical line as the selected vertical line is placed straightly on a left side or a right side of the selected vertical line. Due to the placing, the frame increases in size by 1 in the horizontal direction.

In operation 1040, vertical lines within a predetermined distance from the selected vertical line in the horizontal direction are excluded from the list. Thus, the vertical lines within the predetermined distance are excluded from a subsequent selection In operation 1050, the frame generated by the placing is examined to determine whether it has a sufficient size. That is, the size of the frame increased by the placing is examined to see if it is the same as a required size of the resized frame.

When the size of the frame generated by the placing is the required size, the current frame is the resized frame, and the process is terminated.

When the size of the frame generated by the placing is smaller than the required size, operation 1020 is repeated to place another vertical line.

The technical content according to the example embodiments described above with reference to FIGS. 1 to 9 may be applied to the present embodiments and thus, detailed description is omitted.

An apparatus and a method for generating an extrapolated view based on image resizing according to the above-described embodiments may be recorded in non-transitory computer-readable media including program instructions to implement various operations embodied or performed by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image apparatus, comprising:
    an input view generation unit to output a view at a reference point, the view at the reference point being formed of reference frames according to time;
    an importance calculation unit to calculate an importance of each of a plurality of regions forming the reference frames;
    a resizing unit to resize the reference frames based on the importance and to generate a resized frame; and
    an extrapolated view generation unit to generate an extrapolated view at a virtual point using the resized frame.

2. The image apparatus of claim 1, wherein the image apparatus obtains a plurality of views at a plurality of points, and the input view generation unit outputs a view obtained at a leftmost or rightmost point among the plurality of points.

3. The image apparatus of claim 1, wherein each of the regions comprises color information about pixels included in each of the regions, and the importance calculation unit calculates the importance of each of the regions based on the color information about each of the regions.

4. The image apparatus of claim 3, wherein the importance calculation unit calculates the importance based on a gradient of the color information.

5. The image apparatus of claim 1, wherein each of the regions comprises depth information about pixels included in each of the regions, and the importance calculation unit calculates the importance based on the depth information.

6. The image apparatus of claim 1, wherein each of the regions comprises information about whether pixels included in each of the regions are a foreground or a background, and the importance calculation unit calculates the importance based on the information about whether the pixels are the foreground or the background.

7. The image apparatus of claim 1, wherein the regions are formed by vertically dividing the reference frames.

8. The image apparatus of claim 7, wherein the importance calculation unit calculates the importance based on a horizontal position of the regions in the reference frames.

9. The image apparatus of claim 1, wherein the resizing unit resizes the reference frames by selecting at least one region in ascending order of importance among the plurality of regions and resizing a horizontal size of the selected at least one region.

10. The image apparatus of claim 1, wherein the plurality of regions are vertical lines of the reference frames.

11. The image apparatus of claim 10, wherein the resizing unit resizes the reference frames by selecting at least one vertical line in ascending order of importance among the vertical lines and placing the same vertical line as the selected at least one vertical line next to the selected at least one vertical line.

12. The image apparatus of claim 11, wherein the resizing unit excludes a vertical line positioned within a predetermined distance from the selected vertical line from a subsequent selection.

13. The image apparatus of claim 1, wherein the extrapolated view generation unit generates the extrapolated view by transferring a position of a pixel in an integrated frame using color information and depth information about the integrated frame.

14. The image apparatus of claim 13, wherein the extrapolated view generation unit generates the extrapolated view by transferring the position of the pixel using a weighting proportionate to a distance between the reference point and the virtual point.

15. A method of generating an extrapolated view, comprising:
    generating an input view to output a view at a reference point, the view at the reference point being formed of reference frames according to time;
    calculating an importance of each of a plurality of vertical lines forming the reference frames;
    resizing the reference frames based on the importance and generating a resized frame; and
    generating an extrapolated view at a virtual point using the resized frame.

16. The method of claim 15, wherein the calculating of the importance calculates the importance of each of the vertical lines based on at least one of a horizontal position of each of the vertical lines in the reference frames, color information about pixels included in each of the vertical lines, depth information about the pixels, and information about whether the pixels are a foreground or a background.

17. The method of claim 15, wherein the resizing generates the resized frame by selecting part of the plurality of vertical lines and placing the same vertical lines as the selected vertical lines next to the selected vertical lines.

18. The method of claim 16, wherein the resizing comprises arranging the plurality of vertical lines in ascending order of importance; selecting a first vertical line in the arrangement; and placing the same vertical line as the selected vertical line next to the selected vertical line, wherein a vertical line positioned within a predetermined distance from the selected vertical line is excluded in the arrangement so that the vertical line is excluded from the selection.

19. The method of claim 15, wherein the generating of the extrapolated view comprises warping an image to transfer a position of a pixel in the resized frame using a weighting proportionate to a distance between the reference point and the virtual point, color information about the resized frame, and depth information about the resized frame.

20. A non-transitory computer-readable medium comprising a program for instructing a computer to perform the method of claim 15.

21. A method of producing an extrapolated image from an input image having an image capture view point, comprising:
  producing a motion estimate estimating a motion of the input image;
  producing an integrated image from at least one time wise successive image associated with the input image and the input image when the motion estimate is greater than or equal to a motion threshold;
  producing a resized image from the input image resized responsive to importance of regions of the input image when the motion estimate is less than the motion threshold; and
  producing the extrapolated image having a virtual view point different from the capture view point from one of the integrated image and the resized image.

* * * * *